United States Patent [19]

Reichel

[11] Patent Number: 5,697,831

[45] Date of Patent: Dec. 16, 1997

[54] MACHINE TOOL WITH PLURAL TOOL SPINDLES

[75] Inventor: Frank Reichel, Leonberg, Germany

[73] Assignee: Schaudt Maschinenbau GmbH, Stuttgart, Germany

[21] Appl. No.: 640,169

[22] Filed: Apr. 29, 1996

[30] Foreign Application Priority Data

May 6, 1995 [DE] Germany ............ 195 16 711.2

[51] Int. Cl.⁶ ................................................ B24B 27/04
[52] U.S. Cl. .................... 451/246; 451/251; 451/218; 451/140; 451/121; 83/471.1
[58] Field of Search ............................. 451/120, 121, 451/123, 124, 150, 151, 153, 156, 157, 132, 134, 140, 142, 144, 232, 236, 242, 246, 251, 194, 197, 212, 213, 218, 221; 83/471.1, 500, 599

[56] References Cited

U.S. PATENT DOCUMENTS

| 1,740,551 | 12/1929 | Robinson . | |
|---|---|---|---|
| 3,886,693 | 6/1975 | Tajnafoi et al. | 451/251 |
| 4,052,822 | 10/1977 | Obear | 451/246 |
| 4,306,382 | 12/1981 | Ueda . | |
| 5,148,732 | 9/1992 | Striebig | 83/471.1 |
| 5,472,368 | 12/1995 | Zollig . | |

FOREIGN PATENT DOCUMENTS

| 429 989 | 6/1926 | Germany . | |
|---|---|---|---|
| 876 818 | 7/1952 | Germany . | |
| 27 42 029 C 3 | 3/1979 | Germany . | |
| 30 18 778 C 2 | 11/1980 | Germany . | |
| 41 37 924 C 1 | 2/1993 | Germany . | |
| 84/04480 | 11/1984 | Switzerland | 451/123 |

*Primary Examiner*—Eileen Morgan
*Attorney, Agent, or Firm*—Darby & Darby

[57] ABSTRACT

A circular grinding machine wherein a reciprocable carriage supports a first rotary tool spindle for a relatively large grinding wheel and the housing including the bearing for the first spindle mounts a carrier which is pivotable about the axis of the first spindle by a fluid-operated motor and supports a second tool spindle for a relatively small grinding wheel. The carriage can be advanced to a first position to move the relatively large grinding wheel into coarse material removing contact with a rotary workpiece (such as a camshaft), and the carriage is thereupon retracted to a second position in which the carrier can be pivoted about the axis of the first spindle to move the relatively small grinding wheel into precision-finishing engagement with the pretreated workpiece.

9 Claims, 1 Drawing Sheet

MACHINE TOOL WITH PLURAL TOOL SPINDLES

BACKGROUND OF THE INVENTION

The invention relates to machine tools (such as grinding, polishing, honing, brushing and like machines) in general, and more particularly to improvements in machine tools which are equipped with a plurality of rotary tool spindles each of which can carry and transmit torque to one or more rotary tools. Still more particularly, the invention relates to improvements in machine tools of the type wherein the tool spindles are mounted on a support (such as a reciprocable slide or carriage) which can be actuated to move the spindles toward and away from at least one workholder, for example, a holder for a rotary camshaft or another rotary workpiece which is to be treated by a plurality of tools, e.g., by rotary disc-shaped, wheel-shaped or otherwise configurated rotary or oscillatory grinding, honing polishing or analogous tools.

German patent No. 41 37 924 discloses a grinding machine which employs a first reciprocable carriage for a first tool spindle and a second reciprocable carriage which is mounted on the first carriage and supports a second tool spindle. A drawback of such grinding machines is that their space requirements are quite pronounced, especially because they employ two discrete reciprocable carriages, and also that the first carriage must be reciprocable along an elongated path because it must be moved well out of the way in order to enable the tool on the second spindle to reach a workpiece.

U.S. Pat. No. 1,740,551 discloses a lens beveling attachment for lens edge grinding machines. The patented attachment is provided with two discrete tool spindles and is constructed and assembled in such a way that the grinding wheels on one of the spindles receive torque from the grinding wheel on the other spindle, i.e., the quality of the grinding action is dependent upon the reliability of torque transmission between the grinding wheels on the first and second tool spindles. Moreover, the grinding wheels on one of the tool spindles are held in contact with the adjacent workpieces solely by gravity which is not conducive to a high-precision treatment of workpieces such as is required to properly shape the lobes and/or other parts of cams on a camshaft for use in a motor vehicle.

OBJECTS OF THE INVENTION

An object of the invention is to provide a simple, compact and highly accurate machine tool which can treat a workpiece with a plurality of rotary material removing and/or other tools.

Another object of the invention is to provide a novel and improved twin or dual tool spindle grinding machine for camshafts OF Other rotary workpieces which are to be provided with relatively of highly complex profiles.

A further object of the invention is to provide a multiple-spindle machine tool which constitutes an improvement over machine tools disclosed in the aforementioned German patent No, 41 37 924 and/or in the aforementioned U.S. Pat. No, 1,740,551.

An additional object of the invention is to provide a multiple-spindle grinding machine wherein all of the spindles are carried by a single reciprocable support in the form of a slide, carriage or the like.

Still another object of the invention is to provide a novel and improved arrangement for mounting at least one additional tool spindle on a bearing assembly for a first rotary tool spindle.

A further object of the invention is to provide a multiple-spindle machine tool wherein the reliability of the torque being transmitted to one of the spindles is not dependent on the quality of the tool or tools mounted on another spindle.

Another object of the invention is to provide a multiple tool spindle machine tool whose operation can be automated to any desired or necessary extent.

SUMMARY OF THE INVENTION

The invention is embodied in a machine tool, such as a grinding machine for camshafts of the type utilized in motor vehicles. The improved machine tool comprises a support (e.g., a reciprocable slide or carriage) which is movable back and forth along a predetermined path, a first tool spindle, a bearing assembly provided on the support and rotatably munting the first spindle, a carrier, means for movably mounting the carrier on the bearing assembly, and a second too spindle which is rotatably supported by the carrier.

The arrangement is preferably such that the support is movable between a first position in which a workpiece is engageable by a tool carried by the first spindle, and a second position in which such workpiece is engageable by a tool being carried by the second spindle. For example, the machine tool can be designed to operate in such a way that the workpiece is engageable only by a tool on the second spindle in the second position of the support.

In accordance with a presently preferred embodiment, the carrier is movable (turnable) relative to the bearing assembly about the axis of the first spindle. The bearing assembly can comprise a first bearing which surrounds the first spindle, and a housing which receives the first bearing and is movable with the support. The means for movably mounting the carrier can be rotatably supported by the housing and can include a second bearing which is rotatably mounted in the carrier and rotatably supports the second spindle.

The machine tool preferably further comprises means for moving the carrier relative to the bearing assembly, and such moving means can comprise at least one cylinder-and-piston assembly or any other suitable motor, particularly a fluid-operated motor.

The machine tool can further comprise a work holder which is designed to support a workpiece (such as a camshaft or a crankshaft) for rotation about a predetermined axis. The aforementioned predetermined path for the support preferably extends at least substantially at right angles to the predetermined axis. Furthermore, the arrangement can be such that the carrier, too, is movable relative to the bearing assembly at least substantially at right angles to the predetermined axis. At least one of the spindles can be constructed, designed and arranged to support a rotary grinding tool. For example, each of the two spindles can be constructed, designed and arranged to carry at least one rotary grinding tool. The first spindle can be arranged to carry a first rotary grinding tool having a first diameter, and the second spindle can be arranged to carry a second rotary grinding tool having a second diameter different from (particularly smaller than) the first diameter.

The machine tool can be assembled in such a way that the two spindles are rotatable about two at least substantially parallel axes.

Furthermore, the machine tool can be provided with discrete first and second prime movers (such as variable-speed electric motors) which serve to respectively rotate the first and second spindles.

The novel features which are considered as characteristic of the invention are pointed out on the appended claims. The improved machine tool itself, however, both as to its construction and the mode of assembling and utilizing the same, together with additional features and advantages thereof, will be best understood upon perusal of the following detailed description of certain presently preferred specific embodiments with reference to the accompanying drawings.

DESCRIPTION OF PREFERRED EMBODIMENTS

Figure 2:
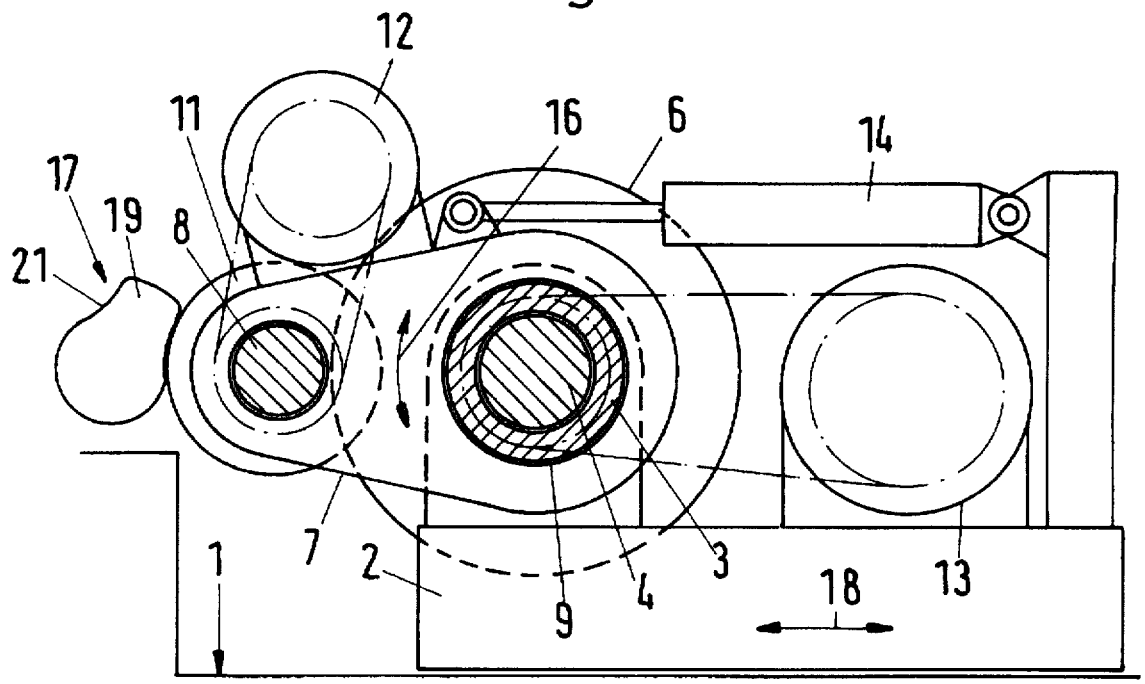
FIG. 2 is a similar fragmentary partly elevational and partly vertical sectional view but shows the workpiece in the process of being trated by a smaller grinding wheel on the other tool spindle.
Figure 1:
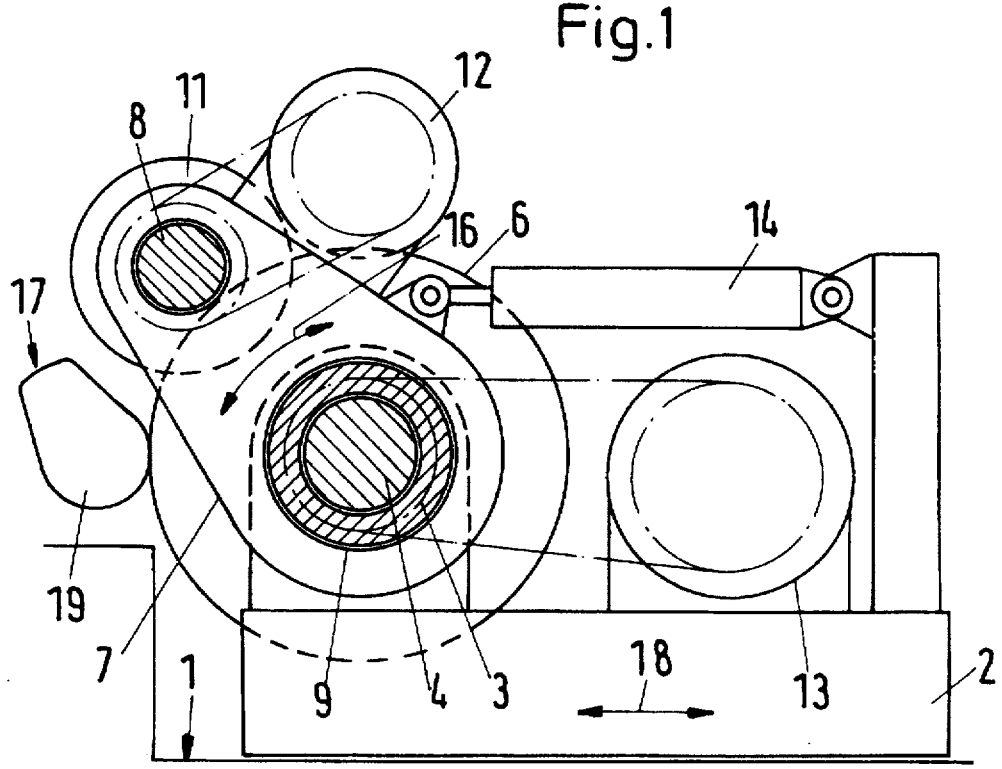
FIG. 1 is a fragmentary partly elevational and partly vertical sectional view of a machine tool which constitutes a circular grinding machine and is constructed and assembled in accordance with a presently preferred embodiment of the invention, a rotary workpiece being shown in the process of being treated by a relatively large grinding wheel on one of the two rotary tool spindles.

The machine tool a portion of which is shown in FIGS. 1 and 2 is a grinding machine having two parallel tool sprindles 4 and 8. The grinding machine comprises a base or bed 1 for a support 2 in the form of a slide or carriage reciprocable (i.e., movable back and forth) in directions indicated by a double-headed arrow 18 at least between a first position which is shown in FIG. 1 and a second position which is shown in FIG. 2. The support 2 is or can be rigid with a bearing assembly 3 for the first tool spindle 4. The illustrated assembly 3 comprises a bearing which surrounds a portion of the spindle 4 and a housing which contains or includes the bearing and is mounted on and shares the reciprocatory movements of the support 2.

In accordance with an advantageous feature of the invention, the housing of the bearing assembly 3 for the spindle 4 comprises or carries means for mounting a carrier 7 for the second spindle 8 in such a way that the carrier 7 can turn about the axis of the spindle 4. The mounting means of the grinding machine which is shown in FIGS. 1 and 2 includes a bearing 9 which surrounds or forms part of the housing of the bearing assembly 3 and rotatably or turnably supports the carrier 7 for a bearing which surrounds the second spindle 8.

The means for moving the carrier 7 and the second tool spindle 8 about the axis of the first tool spindle 4 can comprise a suitable fluid-operated motor, e.g., a double-acting cylinder and piston assembly 14 which can turn the carrier 7 back and forth in directions indicated by a double-headed arrow 16.

The support 2 carries a first prime mover (e.g., a variable-speed electric motor) 13 which can be operated to transmit torque to the tool spindle 4, and the carrier 7 supports a second prime mover (e.g., a variable-speed electric motor) 12 which can be operated to rotate the second tool spindle 8.

Each of the tool spindles can support and transmit torque to one or more rotary tools (the term "rotary" is intended to embrace true rotary as well as oscillatory movements about the axes of the respective tool spindles). The drawings show a larger-diameter grinding tool (e.g., a wheel) 6 on the tool spindle 4, and a smaller-diameter grinding tool (e.g., wheel) 11 on the tool spindle 8.

The reference character 17 denotes a rotary workpiece (such as a camshaft) which is mounted in a suitable work holder for rotation about an axis extending at right angles to the plane of FIGS. 1 and 2, i.e., in parallel to the axes of the tool spindles 4 and 6. The cams of the workpiece 17 include substantially convex first portions 19 which are to be treated or shaped (either primarily or exclusively) by the grinding tool 6 on the tool spindle 4, and substantially concave second portions 21 which are to be treated or shaped (either primarily or exclusively) by the grinding wheel 11 on the tool spindle 8.

A work holder which can be utilized to rotatably support camshafts or analogous rotary workpieces is disclosed, for example, in commonly owned U.S. Pat. No. 5,472,368.

When the support 2 is moved to the position which is shown in FIG. 1 (such movement can be initiated by a rack and pinion drive, by a motor driven belt or chain, or in any other suitable way), the motor 14 maintains the carrier 7 in a position in which the grinding wheel 11 on the spindle 8 is lifted above and away from the workpiece 17 but the grinding wheel 6 on the tool spindle 4 is free to contact and treat the workpiece. Depending on the nature of the work to be performed on the workpiece 17, the motor 14 can be caused to pivot the carrier 7 so that the workpiece is or can be treated by the grinding wheel 11 while the support 2 is maintained in the position of FIG. 1. Alternatively, the support 2 can be retracted to the position of FIG. 2 before the motor 14 is caused to pivot the carrier in a counterclockwise direction in order to move the grinding wheel 11 into material removing engagement with one or more selected portions (such as 21) of the workpiece 17.

In accordance with a presently preferred mode of treating workpieces 17, the grinding wheel 6 is used for preliminary or coarse treatment and the grinding wheel 11 is used for the final or precision finishing treatment of workpieces.

It will be noted that the support 2 is reciprocable in directions (arrow 18) at right angles to the axis of the workpiece 17, and that the carrier 7 is pivotable or rotatable back and forth (arrow 16) in directions at right angles to the axis of the workpiece.

An advantage of mounting the relatively small grinding wheel or wheels 11 on the carrier 7 which is pivotable about the axis of the tool spindle 4, and of mounting one or more larger grinding wheels 6 on the tool spindle 4 is that the grinding wheel or wheels 6 can be used for coarse grinding work which often necessitates the application of relatively large forces, whereas the grinding wheel or wheels 11 can be used for the application of relatively small forces which are normally required to carry out the precision finishing work. Thus, the tool spindle 4 (which can be said to be directly mounted on the support 2) is capable of transmitting larger forces than the tool spindle 8 which is mounted on the pivotable carrier 7. This renders it possible to pivot and to maintain the carrier 7 in a selected angular position by a relatively small motor (such as the motor 14).

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of machine tools and, therefore, such adaptations should and are intended to be comprehended within the meaning and range of equivalence of the appended claims.

What is claimed is:

1. A grinding machine comprising a support movable back and forth along a predetermined path; a first tool spindle rotatable about a first axis; a bearing assembly provided on said support, rotatably mounting said first spindle and comprising a first bearing surrounding said first spindle and a housing receiving said first bearing and movable with said support; a carrier movable relative to said bearing assembly about said first axis; means for movably mounting said carrier on said bearing assembly, said means for movably mounting being rotatably supported by said housing and including a second bearing mounted in said carrier; and a second tool spindle supported by said second bearing and rotatable about a second axis, said support being movable between a first position in which a workpiece is engageable by a grinding tool carried by said first spindle and a second position in which said workpiece is engageable by a grinding tool carried by said second spindle.

2. The grinding machine of claim 1, wherein said workpiece is engageable only by a tool on said second spindle in said second position of said support.

3. The grinding machine of claim 1, further comprising means for moving said carrier relative to said bearing assembly.

4. The grinding machine of claim 3, wherein said means for moving comprises at least one fluid-operated motor.

5. The grinding machine of claim 1, further comprising a work holder arranged to support said workpiece for rotatation about a predetermined axis, said path extending at least substantially at right angles to said predetermined axis.

6. The grinding machine of claim 5, wherein said carrier is movable relative to said bearing assembly at least substantially at right angles to said predetermined axis.

7. The grinding machine of claim 6, wherein said first spindle is arranged to carry a first rotary grinding tool having a first diameter and said second spindle is arranged to carry a second rotary grinding tool having a second diameter smaller than said first diameter.

8. The grinding machine of claim 1, wherein said axes are at least substantially parallel to each other.

9. The grinding machine claim 1, further comprising discrete first and second prime movers for respectively rotating said first and second spindles.

\* \* \* \* \*